United States Patent Office 3,039,581
Patented June 19, 1962

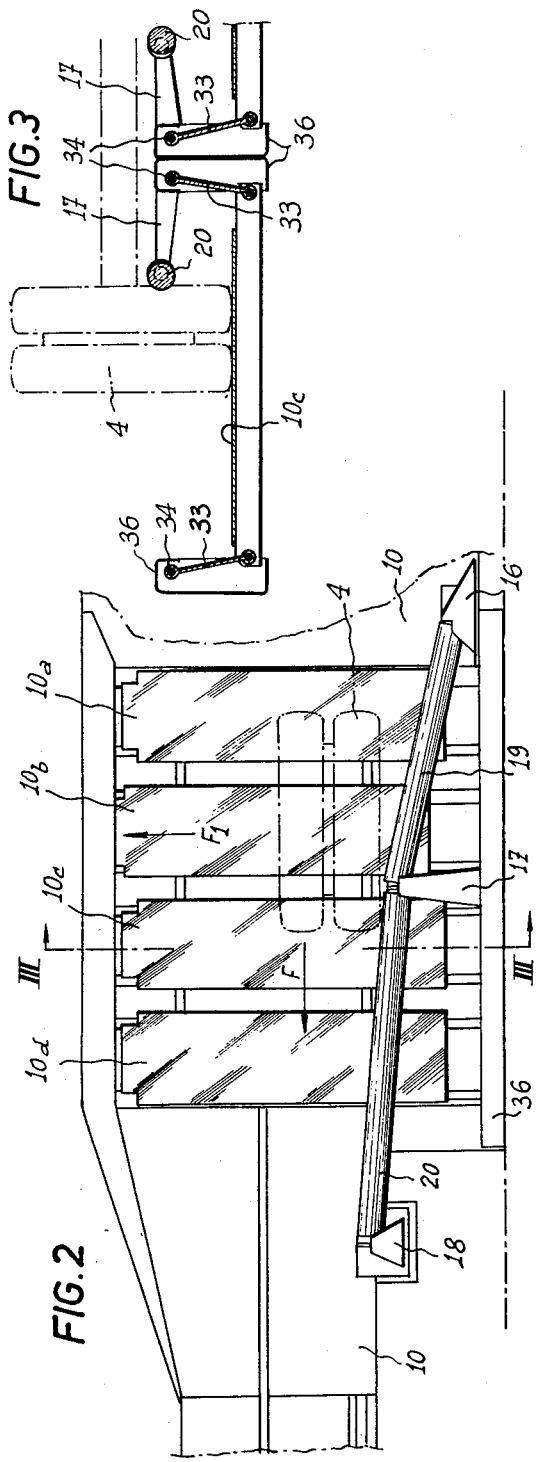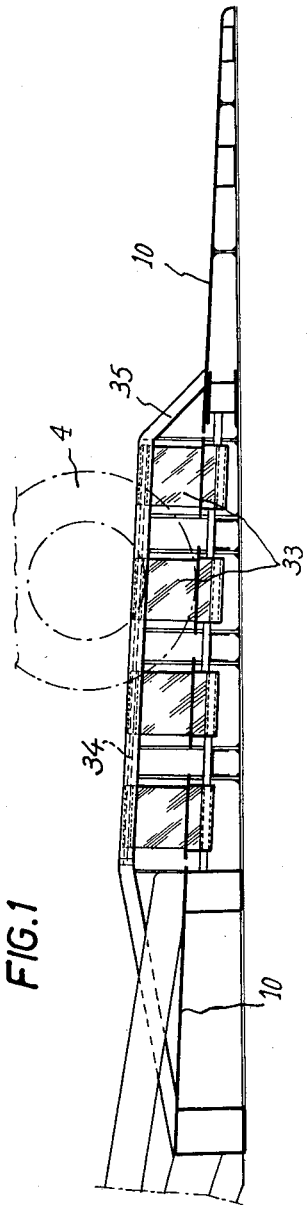

3,039,581
APPARATUS FOR LOADING VEHICLES ON FLAT RAILROAD CARS AND THE LIKE
André Buisson, Paris, France, assignor to Societe Lorraine des Anciens Etablissements de Dietrich et Cie de Luneville, a French society
Filed Feb. 17, 1961, Ser. No. 89,960
Claims priority, application France Feb. 20, 1960
6 Claims. (Cl. 193—38)

This invention relates to apparatus for loading vehicles on elevated platforms, such as on the platforms of flat railroad cars.

Generally such apparatus must include structure defining an incline leading up to the platform to permit the vehicle to be driven or otherwise propelled up the incline to its desired position on the elevated platform. It is known moreover to provide centering means on said structure for coacting with sides of the wheels of the vehicle in order to center the vehicle as it is propelled up the incline if the vehicle was initially presented in a somewhat off-center relationship to the base of the incline. Such centering means may assume the form of two rows of elongated elements disposed symmetrically along the incline and diverging from (or converging towards) each other in the direction from the lower to the upper end thereof so as to engage the inner (or outer) sides of the vehicle wheels and thus gradually shift the vehicle laterally into the desired centered relationship as it is being driven up the incline. It has moreover been proposed, in an attempt to reduce frictional wear and other damage to the sides of the vehicle wheel rims and tires by the engagement of them with the centering elements, to provide the latter in the form of rollers journalled on axes parallel to the plane of the incline.

While such an arrangement of centering means has been highly successful in reducing the wear sustained by the sides of the wheels and tires during loading operations, a troublesome source of damage to the tires has remained in that the tires are laterally shifted over the surface of the incline during the centering action of the rollers thus subjecting the tire tread surfaces to substantial wear especially in the case of heavy-weight vehicles.

While it has been proposed to eliminate this defect by providing the incline with transversely-shiftable portions adjacent the centering means, said portions being mounted in transverse slideways relatively to the main, stationary structure of the incline, such arrangements have not given satisfactory performance in practice. The slideway mounting means of the shiftable portions has required the structure to be considerably reinforced and its weight and size objectionably increased; moreover the provision of return springs has been required to bias the shiftable portions towards their normal positions thus further increasing the complication of the resulting apparatus.

It is an object of this invention to provide improved apparatus for loading vehicles on railroad cars and the like which will not subject the vehicle wheels and tires to any substantial degree of wear or other damage during loading operations, either in the side areas or the tire-tread areas of them. Another object is to provide such apparatus which will be simple, rugged and reliable, and relatively lightweight and inexpensive. A further and specific object is to provide such apparatus in which the incline is partly composed of laterally shiftable portions for achieving a centering of the vehicle without substantial friction between the vehicle tires and incline surface, and in which the requirement for springs to bias said shiftable elements to a normal position is eliminated. Other objects will appear.

In accordance with one aspect of the invention the apparatus comprises structure defining an incline leading up to the elevated platform, and including a number of flat portions extending in pairs transversely of the incline and links suspending said portions for limited transverse swinging displacement independently of one another about axes parallel to the plane of the incline. A symmetrical pair of rows of roller or equivalent centering elements are provided along the incline in diverging relationship from one another toward one end of the incline (e.g. the upper end) for engagement by the sides (e.g. the inner sides) of the wheels of a vehicle for shifting the vehicle laterally into centered condition by a lateral swinging of said portions.

An exemplary embodiment of the invention will now be described for purposes of illustration but not of limitation with reference to the accompanying drawings, wherein:

FIG. 1 is a view of the improved apparatus in side elevation,

FIG. 2 shows the same apparatus in partial plan, only one side of the entire apparatus, above the lowermost horizontal line of the figure, being shown and it being understood that the other side of the apparatus below said line would be generally symmetrical with respect to that shown, and FIG. 3 is a partial sectional view on line III—III of FIG. 2.

The apparatus shown comprises a low-gradient inclined plane 10 generally constructed and supported in a conventional manner that does not require detailed description. Mounted above the incline are two rows of elongated rollers, only one row of rollers 19 and 20 being visible in FIG. 2, and the two rows being arranged symmetrically and being generally divergent in the direction from the base to the top of the incline. The rollers are each provided with end trunnions which are pivoted in suitable bearing supports carried from brackets such as 16, 17 18 upstanding from the structure.

Within the area defined by the longitudinal extent of the rows of rollers, the otherwise continuous surface of incline 10 is interrupted or recessed, and instead there are provided four pairs of transversely extending flat sections or portions which are generally continuous with the surface of the incline 10 but are shiftably mounted thereon as presently described. In FIG. 2, only the four elements 10a, 10b, 10c and 10d disposed to one side of the longitudinal midline of the incline are shown. The mounting means for the flat sections such as 10c are best seen from FIG. 3. The lateral ends of each such section is pivotally connected to the lower end of a link 33, the links 33 being shown in FIG. 1 as being in the form of plates, but this of course is not essential. The upper ends of the links 33 are pivoted about shafts 45 mounted on the stationary structure of the apparatus at a suitable elevation above the plane of the incline 10 and parallel to said plane, by means of brackets such as 35. Protective casings 36 of sheeting are provided for partially surrounding the links.

In operation, assume a vehicle such as a heavy-duty truck is driven into the base of the incline 10 in the direction indicated by arrow F in a laterally (e.g. leftwardly) displaced or off-center condition such that the inner surface of the (e.g. right) front wheel of the vehicle engages one of the rollers such as 20, as shown for the vehicle wheel 4 illustrated in dot-dash lines. Owing to the rotatable mounting of the rollers 19 and 20 such engagement will not result in damaging friction and wear of the inner side surfaces of the tires or rims of the wheels. However the roller exerts a lateral reaction force against the wheel and this force is transferred to the particular shiftable section 10b upon which the wheel happens to be positioned at the time, so that, that section is shifted rightward with respect to the direction of advance of the vehicle indicated by arrow F in FIG. 2, such shifting being permitted by a swinging of the related links 33 about their upper pivots 34. This lateral shift of the section 10b indicated by arrow $F_1$ (as well as the simultaneous shift of the corresponding section of the same pair, not shown) results in bringing the vehicle as a whole to a position lying closer to its true centered position. Thus the successive action of the respective pairs of shiftable sections 10a, 10b, 10c, 10d finally brings the vehicle to its true centered position on the incline without having subjected the tires of the vehicle to any objectionable friction either on their side surfaces or on their outer tread areas.

It will be realized that one advantageous feature of the invention is the fact that owing to the swinging-linkage type of mounting means provided for the shiftable sections of the incline, the return of each section to its normal position on termination of a lateral force exerted thereon by a wheel, will be effected of its own accord by the weight of the section, without requiring the provision of any centering springs therefor.

It will be understood that various changes may be made in the single exemplary embodiment of the invention illustrated and described without exceeding the scope of the invention. Owing to the rotatable mounting of the rollers 19 and 20 such engagement will not result in damaging friction and wear of the inner side surfaces of the tires or rims of the wheels. However the roller exerts a lateral reaction force against the wheel and this force is transferred to the particular shiftable section 10b upon which the wheel happens to be positioned at the time, so that, that section is shifted rightward with respect to the direction of advance of the vehicle indicated by arrow F in FIG. 2, such shifting being permitted by a swinging of the related links 33 about their upper pivots 34. This lateral shift of the section 10b indicated by arrow $F_1$ (as well as the simultaneous shift of the corresponding section of the same pair, not shown) results in bringing the vehicle as a whole to a position lying closer to its true centered position. Thus the successive action of the respective pairs of shiftable sections 10a, 10b, 10c, 10d finally brings the vehicle to its true centered position on the incline without having subjected the tires of the vehicle to any objectionable friction either on their side surfaces or on their outer tread areas.

It will be realized that one advantageous feature of the invention is the fact that owing to the swinging-linkage type of mounting means provided for the shiftable sections of the incline, the return of each section to its normal position on termination of a lateral force exerted thereon by a wheel, will be effected of its own accord by the weight of the section, without requiring the provision of any centering springs therefor.

It will be understood that various changes may be made in the single exemplary embodiment of the invention illustrated and described without exceeding the scope of the invention as claimed. Thus the centering elements shown as rows of rollers may be constructed and arranged in other forms, and may be arranged for engagement with the outer rather than the inner sides of the wheels if desired.

What I claim is:

1. Apparatus for loading a vehicle upon an elevated platform comprising structure defining an incline leading up to said platform; said incline-defining structure including a number of flat sections and linkage means pivoted to said structure and to said sections for permitting limited parallel shifting of said sections transversely of said incline independently of one another; and centering means mounted on said structure for engagement by the sides of wheels of a vehicle when introduced to the bottom of said incline in out-of-center relationship therewith to displace the vehicle into centered relationship by a lateral shifting of said sections.

2. Apparatus for loading a vehicle upon an elevated platform comprising structure defining an incline; said structure including a number of flat sections mounted for limited transverse shifting displacement with respect to the structure independently of one another; and symmetrical pairs of roller means journalled on said structure for engagement by the sides of wheels of a vehicle introduced to the bottom of the incline in out-of-center relation therewith and disposed to displace the vehicle into centered relation by a lateral shifting of said sections.

3. Apparatus for loading a vehicle upon an elevated platform comprising structure defining an incline and including a number of flat sections extending in pairs transversely of the incline and linkage means suspending said sections for limited transverse swinging displacement independently of one another, at least one asymmetrical pair of elongated centering elements extending along the incline and diverging from one another toward one end of the incline for engagement by sides of wheels of a vehicle presented in off-center relation to the incline for shifting the vehicle laterally into centered relation by a lateral swinging of said portions.

4. Apparatus as claimed in claim 3, wherein said centering elements are rollers journalled about axes parallel to the plane of the incline.

5. Apparatus as claimed in claim 3, wherein said centering elements diverge from one another from the bottom to the top end of the incline and are disposed for engagement by the inner sides of said vehicle wheels.

6. Apparatus as claimed in claim 2, including link means having their one ends pivoted to sides of said sections about axes parallel to the longitudinal direction of the incline and having other ends pivoted to said structure about axes parallel to said longitudinal direction.

References Cited in the file of this patent

FOREIGN PATENTS 1,173,473    France _____ Oct. 27, 1958